United States Patent
Perley et al.

(10) Patent No.: US 9,759,192 B2
(45) Date of Patent: Sep. 12, 2017

(54) SYSTEM AND METHOD FOR BRAKING A WIND TURBINE ROTOR AT AN OVERSPEED CONDITION

(75) Inventors: Thomas Franklin Perley, Simpsonville, SC (US); Brandon Shane Gerber, Charleston, SC (US); Aaron Yarbrough, Clemson, SC (US)

(73) Assignee: General Electric Company, Schenectady, NY (US)

( * ) Notice: Subject to any disclaimer, the term of this patent is extended or adjusted under 35 U.S.C. 154(b) by 1428 days.

(21) Appl. No.: 13/587,133

(22) Filed: Aug. 16, 2012

(65) Prior Publication Data

US 2014/0050579 A1 Feb. 20, 2014

(51) Int. Cl.
*F03D 7/02* (2006.01)

(52) U.S. Cl.
CPC .......... *F03D 7/0248* (2013.01); *Y02E 10/723* (2013.01)

(58) Field of Classification Search
None
See application file for complete search history.

(56) References Cited

U.S. PATENT DOCUMENTS

| | | | |
|---|---|---|---|
| 5,907,192 A | 5/1999 | Lyons et al. | |
| 6,265,785 B1 * | 7/2001 | Cousineau | F03D 7/0248 290/42 |
| 7,488,155 B2 | 2/2009 | Barbu et al. | |
| 2009/0223307 A1 | 9/2009 | Staedler et al. | |
| 2010/0123314 A1 | 5/2010 | Menke | |
| 2011/0133456 A1 | 6/2011 | Bagepalli et al. | |
| 2011/0135465 A1 * | 6/2011 | Braicks | F03D 7/0248 416/1 |
| 2011/0140425 A1 | 6/2011 | Staedler | |
| 2012/0187683 A1 * | 7/2012 | Wohlleb | F03D 7/0248 290/44 |

* cited by examiner

*Primary Examiner* — John K Fristoe, Jr.
*Assistant Examiner* — Jeffrey A Brownson
(74) *Attorney, Agent, or Firm* — Dority & Manning, P.A.

(57) ABSTRACT

A system and method for braking a wind turbine includes monitoring rotation of the wind turbine generator rotor. A braking torque is applied to reduce the rotational speed of the rotor at a first setpoint rotational speed. The braking torque is proportionally increased as the rotational speed of the rotor increases beyond the first detected setpoint rotational speed up to a maximum braking torque.

14 Claims, 6 Drawing Sheets

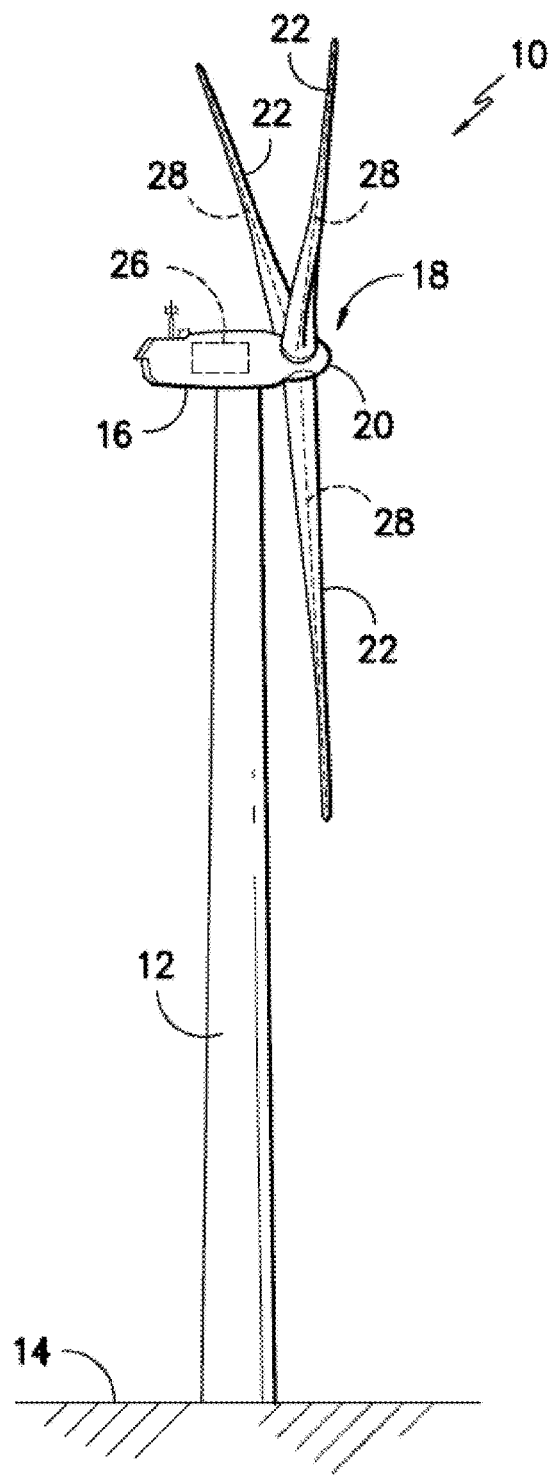
FIG. -1-

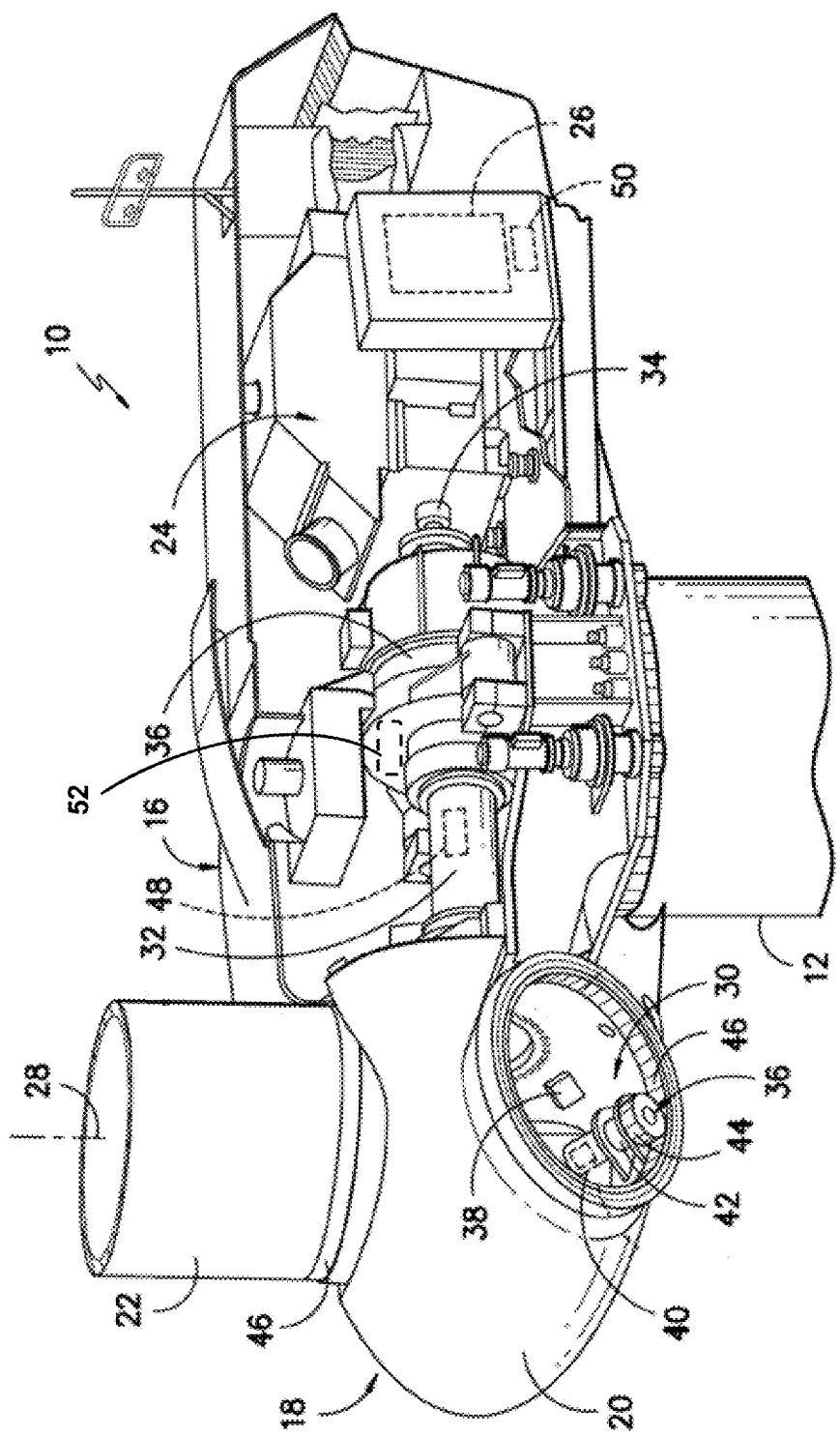
FIG. -2-

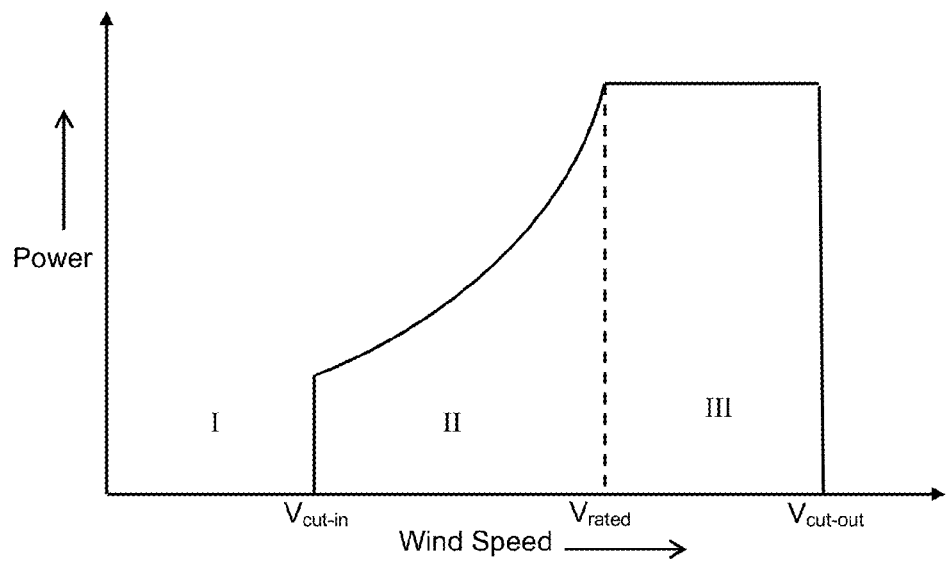
*FIG. -3-*
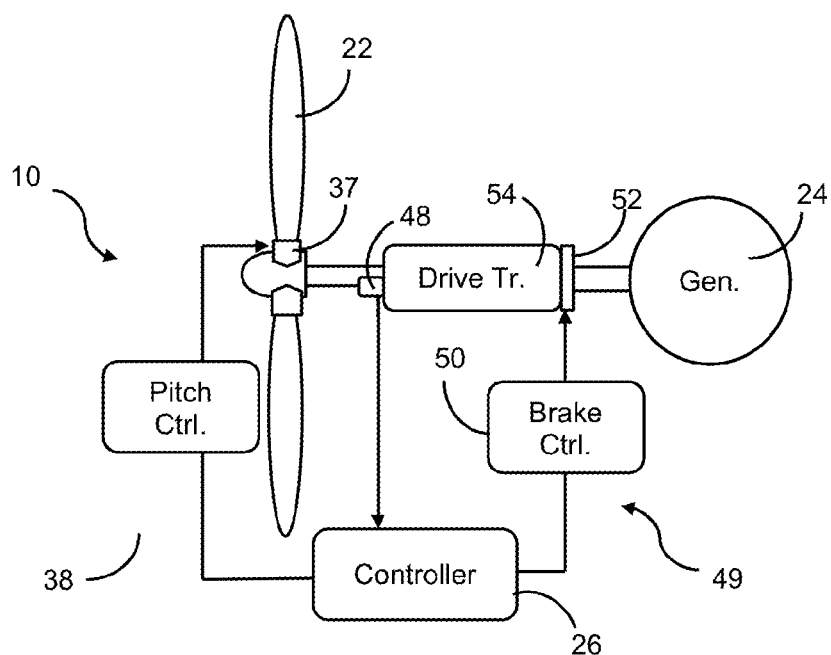
*FIG. -4-*

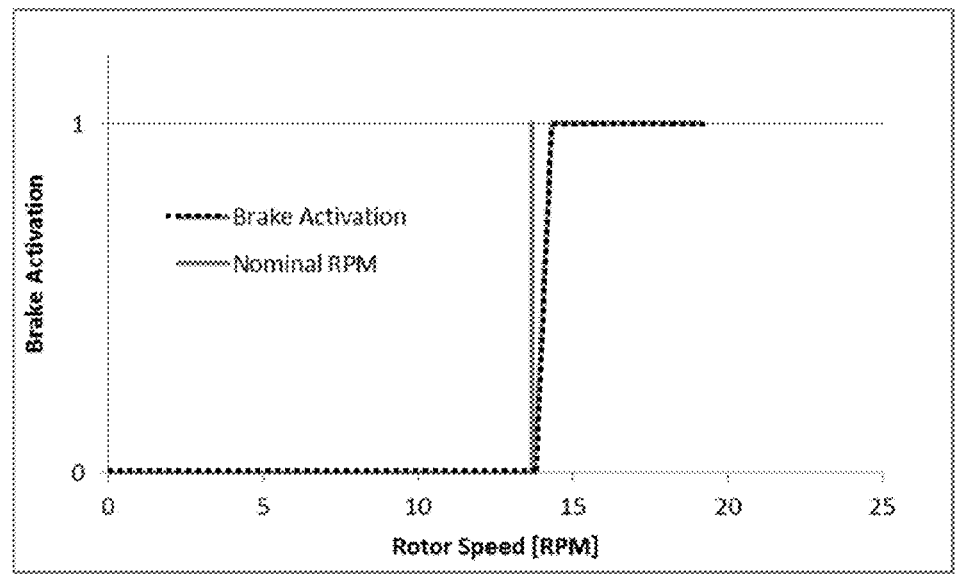
FIG. -5-
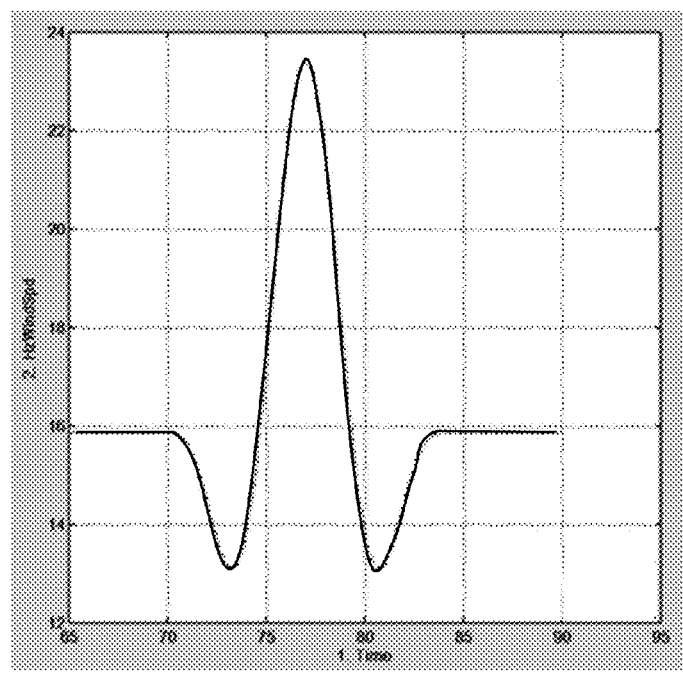
FIG. -6-

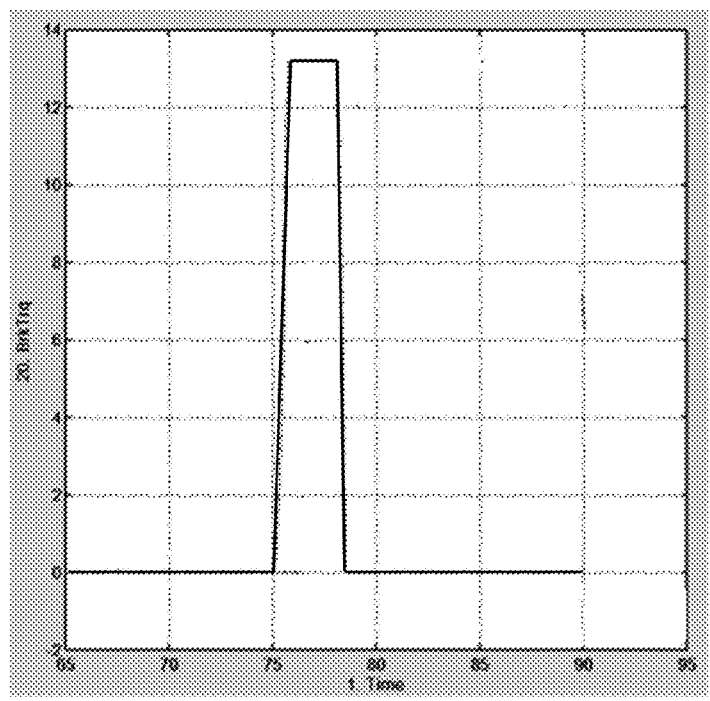
FIG. -7-
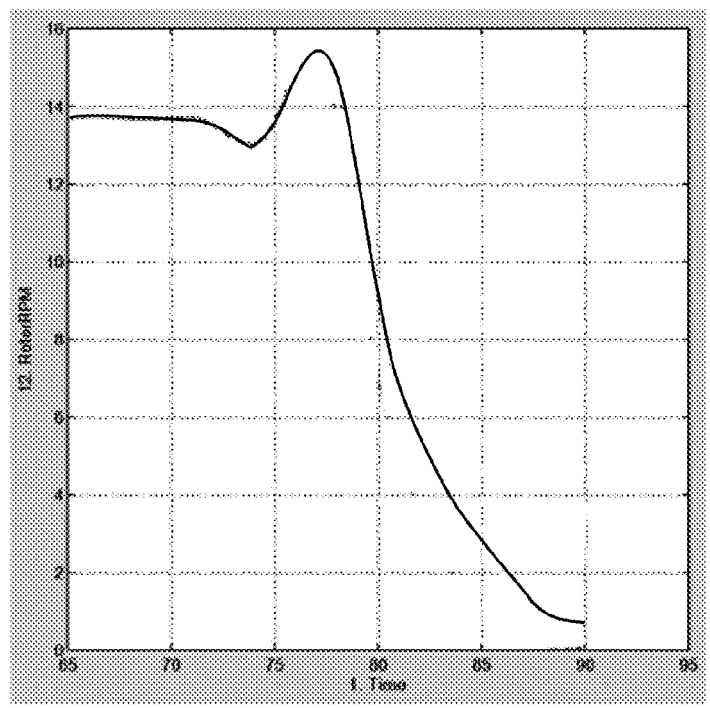
FIG. -8-

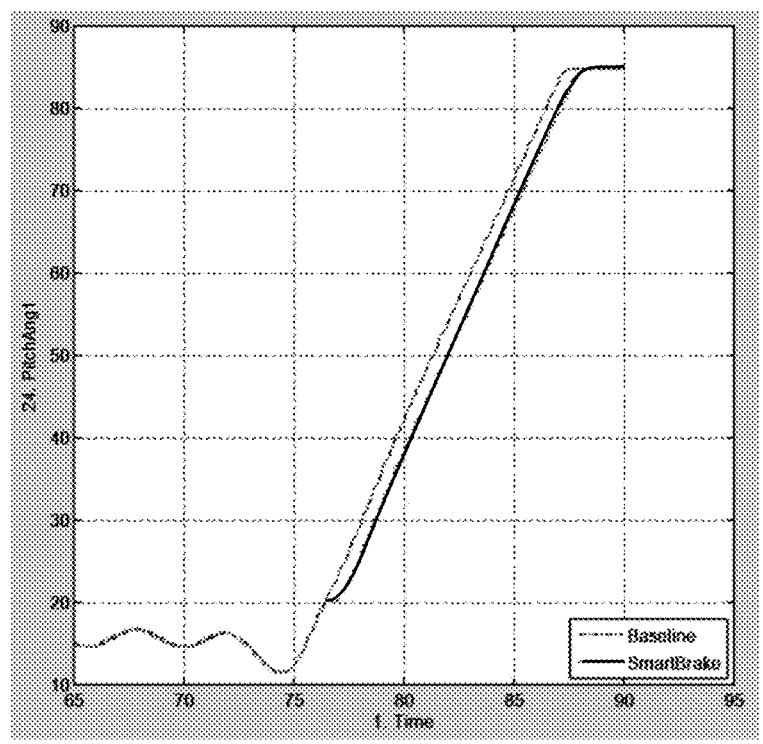
*FIG. -9-*

SYSTEM AND METHOD FOR BRAKING A WIND TURBINE ROTOR AT AN OVERSPEED CONDITION

FIELD OF THE INVENTION

The present subject matter relates generally to wind turbines, and more particularly to a system and method for controllably braking a wind turbine rotor at a sensed overspeed condition.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Modern utility-grade wind turbines generally include redundant braking systems. An aerodynamic braking system slows or stops rotation of the rotor blades by pitching the blades to a feathered position. Such systems may include a stored energy source to enable the rotor blades to be pitched during a power failure. A mechanical braking system, such as a hydraulic brake, is also generally provided to stop the rotor against full wind speed. A stored energy source, such as a hydraulic accumulator, may enable actuation of the mechanical brake during a power failure.

Extreme loads are generated on various wind turbine components at rotor overspeed conditions, particularly at overspeed fault conditions, and it is thus an important operating consideration to maintain tight control over the rotor speed. The fault loads on the rotor blades, hub, and main shaft are typically the design driving loads for these components. Under traditional braking control methods, aerodynamic braking is utilized at rotor speeds in excess of nominal rotor speed and the mechanical brake is applied after the turbine faults at a defined rotor speed, which is typically at about 111%. The mechanical brake is activated in accordance with a time-dependent braking profile. However, with this control methodology, the extreme transient loads experienced at the fault speed are not significantly eliminated.

Accordingly, an improved system and/or method for braking the wind turbine rotor at overspeed conditions would be welcomed in the technology.

BRIEF DESCRIPTION OF THE INVENTION

Aspects and advantages of the invention will be set forth in part in the following description, or may be obvious from the description, or may be learned through practice of the invention.

In one aspect, a wind turbine includes a hub with a plurality of rotor blades configured thereon. The hub is connected to a generator rotor via a drive train. A sensor is operably disposed to directly or indirectly monitor rotation of the rotor. The sensor may monitor any one or combination of rotational characteristics of the rotor, such as rotational speed or acceleration. A rotor brake is configured with the wind turbine to reduce the rotational speed of the rotor. The rotor brake may be any suitable device that applies a braking torque to the rotor, such as any manner of mechanical, electrical, hydraulic, or other type of brake mechanism. A brake control system is operatively coupled to the brake and sensor and is configured to apply a braking torque via the brake to the rotor at a first setpoint rotational speed. As the rotor rotational speed increases beyond the first setpoint rotational speed, the control system proportionally increases the braking torque.

In a particular embodiment, the first setpoint rotational speed is defined above a rated rotor speed for the wind turbine. For example, the first setpoint rotational speed may be between rated speed and 103% of rated speed. In a particular embodiment, the first setpoint rotational speed is set at 1% or 2% above rated speed. The brake control system may be configured to initially apply the braking torque to the rotor at the first setpoint rotational speed and to increase the braking torque to a full braking torque applied at a second setpoint rotational speed that is less than the fault rotational speed of the wind turbine. For example, in a particular embodiment, the second setpoint rotational speed is less than 110% of rated speed.

The brake control system may be configured to apply the increasing braking torque as a linear function of increasing rotor rotational speed. In an alternate embodiment, the brake control system may apply the increasing braking torque as an exponential function, or any other proportional function, of increasing rotor rotational speed.

The rotor brake may be any suitable brake conventionally used in wind turbines. For example, the rotor brake may be a hydraulic brake operably configured in the wind turbine drive train to effectively slow or stop the rotor. The hydraulic brake may include any combination of features, including an accumulator to activate the brake upon a turbine fault or loss of grid power.

The present invention also encompasses various method embodiments for controlling rotational speed of a wind turbine, particularly in an overspeed condition. In a particular embodiment, the method includes monitoring a rotational aspect, such as speed or acceleration, of the wind turbine generator (either directly or indirectly). A braking torque is applied to the rotor at a detected first setpoint rotational speed. The method includes proportionally increasing the braking torque as a function of rotor rotational speed as the rotational speed of the rotor increases beyond the first setpoint rotational speed.

In a particular method embodiment, the first setpoint rotational speed is defined above a rated rotor speed for the wind turbine, and the method includes increasing the braking torque applied to the rotor from an initial value at the first setpoint rotational speed up to a full braking torque applied at a second setpoint rotational speed prior to the rotor reaching a fault rotational speed.

In a certain embodiment, the first setpoint rotational speed is between rated speed and 103% of rated speed, and the second setpoint rotational speed is less than 110% of rated speed.

The method may include increasing the braking torque as a linear function of increasing rotor rotational speed between the first and second setpoint rotational speeds. In an alternate method embodiment, the braking torque is increased as an exponential or other proportional function of increasing rotor rotational speed between the first and second setpoint rotational speeds.

Alternate method embodiments may include applying an aerodynamic braking torque to the rotor in conjunction with the rotor braking torque, for example with the wind turbine pitch control system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a conventional wind turbine;

FIG. 2 illustrates a simplified, internal view of one embodiment of a nacelle of a wind turbine;

FIG. 3 is a diagram of a conventional power curve for a wind turbine generator;

FIG. 4 is a block diagram of wind turbine control components in accordance with an embodiment of the invention;

FIG. 5 is a diagram of mechanical brake activation over time in accordance with embodiments of the invention;

FIG. 6 is a diagram of wind speed over time relative to FIGS. 7 through 9;

FIG. 7 is a diagram of applied mechanical brake torque over time in accordance with embodiments of the invention;

FIG. 8 is a diagram of generator speed over time in accordance with embodiments of the invention; and FIG. 9 is a diagram of pitch angle over time in accordance with an embodiment of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to FIG. 3, modern utility-grade wind turbines are generally operated in accordance with a design power curve wherein in a first region (Region I), the wind speed is too low to warrant turbine operation and the turbine blades are pitched to a full feather position corresponding to the pitch angle that produces minimum aerodynamic torque. At a wind speed sufficient for start-up ($V_{cut-in}$), the blades are pitched to a Region II nominal pitch angle wherein a maximum aerodynamic lift is generated to produce torque and turn the rotor. In Region II, the wind speed and generator torque are below "rated" values, and blade pitch is generally held constant at an optimal angle to produce maximum aerodynamic torque. With an increase in wind speed in Region II, power captured by the wind turbine increases along with mechanical loads on the turbine structure and components.

At rated (nominal) wind speed ($V_{rated}$), the wind turbine reaches its rated power in Region III of the design power curve. In this region, the generator operates at rated rotational speed and power is limited to this rated power to maintain the machine loads within design limits. Generator torque is held constant and blade pitch is controlled to regulate turbine speed at rated speed. For safety and machine load considerations, the wind turbine is shut down for wind speeds in excess of a defined cut-out wind speed ($V_{cut-out}$) where the generator reaches an overspeed fault condition, which is typically about 110% of rated speed.

The fatigue and extreme load limits over the design life of the wind turbine are, as expected, generated primarily at wind speeds in excess of $V_{rated}$, particularly at wind speed approaching $V_{cut-out}$ where the generator approaches fault speed.

In general, the present subject matter is directed to a system and method for controlling rotational speed of a wind turbine, particularly at rotor overspeed conditions. In a particular embodiment, the method includes detecting rotational characteristic of the wind turbine generator (directly or indirectly). This characteristic may be, for example, rotational speed or acceleration. A braking torque is applied to the rotor by any suitable braking mechanism, such as a mechanical brake, electric motor brake, hydraulic brake, water brake, and the like, at an appropriate location in the drive train at a first setpoint rotational speed that is greater than rated rotational speed and less than $V_{cut-out}$. The method includes proportionally increasing the braking torque as a function of rotor rotational speed as the rotational speed of the rotor increases beyond the first detected setpoint rotational speed.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or main controller 26 centralized within the nacelle 16. In general, the main controller 26 may comprise a computer or other suitable processing unit. Thus, in several embodiments, the main controller 26 may include suitable computer-readable instructions that, when implemented, configure the controller 26 to perform various different functions, such as receiving, transmitting and/or executing wind turbine control signals (e.g., pitch commands). As such, the main controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 as well as the loads acting on the rotor blade 22. For example, the main controller 26 may individually control the pitch angle of each rotor blade 22 by transmitting suitable pitch commands to a pitch system 30 (FIG. 2) of the rotor blade 22. During operation of the wind turbine 10, the controller 26 may generally transmit pitch commands to each pitch system 30 in order to alter the pitch angle of each rotor blade 22 between 0 degrees (i.e., a power position of the rotor blade 22) and 90 degrees (i.e., a feathered position of the rotor blade 22).

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 via a drive train 54 (FIG. 4) for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the main controller 26 may also be located within the nacelle 16. As is generally understood, the main controller 26 may be communicatively coupled to any number of the components of the wind turbine 10 in order to control the operation of such components. For example, as indicated above, the main controller 26 may be communicatively coupled to each pitch system 30 of the wind turbine 10 (one of which is shown) to facilitate rotation of each rotor blade 22 about its pitch axis 28.

As shown in FIG. 2, each pitch system 30 may include a pitch adjustment mechanism 36 and a pitch controller 38 communicably coupled to the pitch adjustment mechanism 36. In general, each pitch adjustment mechanism 36 may include any suitable components and may have any suitable configuration that allows the pitch adjustment mechanism 36 to function as described herein. For example, in several embodiments, each pitch adjustment mechanism 36 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28.

In alternative embodiments, it should be appreciated that each pitch adjustment mechanism 36 may have any other suitable configuration that facilitates rotation of a rotor blade 22 about its pitch axis 28. For instance, pitch adjustment mechanisms 36 are known that include a hydraulic or pneumatic driven device (e.g., a hydraulic or pneumatic cylinder) configured to transmit rotational energy to the pitch bearing 46, thereby causing the rotor blade 22 to rotate about its pitch axis 28. Thus, in several embodiments, instead of the electric pitch drive motor 40 described above, each pitch adjustment mechanism 36 may include a hydraulic or pneumatic driven device that utilizes fluid pressure to apply torque to the pitch bearing 46.

The operation of the pitch adjustment mechanism 36 for each rotor blade 22 may generally be controlled by the main controller 26 via the individual pitch controller 38 for that rotor blade 22. Thus, in several embodiments, the main controller 26 and each pitch controller 38 may be in communication with one another and/or the pitch adjustment mechanism 36 via a wired connection, such as by using a suitable communicative cable. In other embodiments, the main controller 26 and each pitch controller 38 may be in communication with one another and/or the pitch adjustment mechanism 36 via a wireless connection, such as by using any suitable wireless communications protocol known in the art.

It should be appreciated that, although the main controller 26 may generally be utilized to control the pitch adjustment mechanisms 36 via the pitch controllers 38, each pitch controller 38 may also be configured to independently control the operation of its respective pitch adjustment mechanism 36. For example, when a communication failure occurs between the main controller 26 and one or more of the pitch controllers 38 (e.g., due to power loss, controller failure, communication breakdown and/or the like), the pitch controllers 38 may be configured to implement the stopping procedures described herein in order to stop the operation of the wind turbine 10.

Referring still to FIG. 2, the wind turbine 10 may also include a plurality of sensors 48 for monitoring one or more operating conditions of the wind turbine 10 for purposes of the present method and system. As used herein, an operating condition of the wind turbine 10 is "monitored" when a sensor 48 is used to determine its present value. Thus, the term "monitor" and variations thereof are used to indicate that the sensors 48 need not provide a direct measurement of the operating condition being monitored. For example, one or more sensors 48 (such as an optical encoder) may be operatively configured at a suitable location along the drive train 54 (FIG. 4) to directly or indirectly measure the rotational speed of the generator rotor. For example, the rotor speed may be derived with a sensor 48 that measures the rotational speed of the rotor hub 20, low speed shaft 32, generator shaft 34, and so forth.

In addition, the wind turbine 10 may also include additional sensors for monitoring various other operating conditions of the wind turbine 10. For instance, the wind turbine 10 may include one or more sensors configured to monitor the operation of the pitch adjustment mechanisms 36 (e.g., by monitoring the current input to and/or the torque output of each pitch adjustment mechanism 36). In addition, the wind turbine 10 may include one or more sensors configured to monitor the operation of the main controller 26 and/or the pitch controllers 38, such as by monitoring the power to and commands transmitted from such controller(s) 26, 38. Further, the wind turbine 10 may also include various other sensors for monitoring any other suitable operating conditions of the wind turbine 10, such as the pitch angle of each rotor blade 22, the speed of the rotor 18 and/or the rotor shaft 32, the speed of the generator 24 and/or the generator shaft 34, the torque on the rotor shaft 32 and/or the generator shaft 34, the wind speed and/or wind direction, grid conditions, power input to the components of the wind turbine 10 and/or any other suitable operating conditions.

Referring to FIG. 2, a braking system is operatively configured along the generator drive train and includes a brake 52 controlled by a brake controller 50. Although not limited to a particular construction, the brake 52 in one embodiment may be a disc and caliper arrangement, such as a hydraulically actuated disc and caliper brake, that is sufficient to bring the rotor to a full stop and hold the rotor at a fault condition, for example an overspeed fault. In certain embodiments, the brake 52 may be operatively configured on the low speed shaft 32, high speed shaft 34, or on the generator 24. Reference may be made to U.S. Pat. No. 6,265,785 for a more detailed description of a suitable hydraulic braking system that may be used in embodiments of the present invention. As mentioned above, the brake may be any suitable device or system that applies a braking torque to the rotor at any location along the generator drive train.

Referring now to FIG. 4, there is illustrated a block diagram of one embodiment of a suitable system configuration for accomplishing the desired control functions in accordance with aspects of the invention wherein the main controller 26 is interfaced with the pitch controllers 38 and the brake controller 50, as well as the rotor speed sensor 48. The controller 26 may include one or more processors and associated memory devices configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory devices may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory devices may generally be configured to store suitable computer-readable instructions that, when implemented by the processor(s), configure the controller 26 to perform various functions including, but not limited to, transmitting suitable control signals to one or more of the pitch adjustment mechanisms 37, control generator torque, monitor various operating conditions of the wind turbine 10, and implement the disclosed braking sequence via the brake controller 50 and mechanical brake 52 in accordance with aspects of the present methodology.

Various aspects of exemplary method and system embodiments are explained by reference to FIGS. 4 through 9. In the depicted embodiment, a brake control system 49 includes the brake controller 50 interfaced with the system controller for controlling the brake 52. In an alternate embodiment, the brake controller 50 may be interfaced with a separate, dedicated controller. It should be understood that "brake control system" is meant to encompass any configuration of hardware and software components operatively configured to actuate and control the brake torque applied by the mechanical brake. In response to a command signal from the system controller 26 (or other controller), the brake controller 50 actuates the brake 52 to apply a braking torque to the generator rotor at a first setpoint rotational speed of the generator rotor (which may be a function of the signal generated by the sensor 48). As discussed above, the braking torque may be applied at various locations along the drive train 54. As depicted in FIG. 5, as the detected rotor rotational speed increases beyond the first setpoint rotational speed, the control system 49 proportionally increases the braking torque applied by the brake 52.

Referring to FIG. 5, in a particular embodiment, the first setpoint rotational speed is defined above a rated (nominal) rotor speed for the wind turbine. For example, the first setpoint rotational speed may be between rated speed and 103% of rated speed. In a particular embodiment, the first setpoint rotational speed is set at 1% or 2% above rated rotor speed. The brake control system 49 may be configured to initially apply the braking torque to the rotor (via a component of the drive train 54) at the first setpoint rotational speed and to increase the braking torque to a full braking torque applied at a second setpoint rotational speed that is less than the fault rotational speed of the wind turbine. For example, in a particular embodiment, the fault rotational speed of the wind turbine is set at about 110% of rated speed, and the second setpoint rotational speed is less than 110% of rated speed.

The brake control system 49 may be configured to apply the increasing braking torque as a linear function of increasing rotor rotational speed, as depicted in FIG. 5. In an alternate embodiment, the brake control system 4 may apply the increasing braking torque as an exponential or other non-linear proportional function of increasing rotor rotational speed.

As discussed above, the brake 52 may be any suitable brake conventionally used in wind turbines. For example, the brake 52 may be a hydraulic brake operably configured in the wind turbine drive train 54 to effectively slow or stop the rotor. The hydraulic brake may include any combination of features, including an accumulator to activate the brake upon a turbine fault or loss of grid power.

FIGS. 6 through 9 are time-dependent graphs illustrating various characteristics of the present braking method and system control. FIG. 6 is a graph of wind speed over time. After an initial dip, wind speed exceeds rated wind speed just prior to time "75." Referring to FIG. 7, braking torque is initially applied at time "75" at the first setpoint rotational speed of the rotor, which is the rotor speed greater than nominal speed at the wind state in excess of $V_{rated}$. Referring to FIG. 8, this first setpoint rotor speed is slightly greater than nominal rotor speed (i.e., the rotor speed at time "70").

As rotor speed continues to increase after the initial braking torque is applied (FIG. 8) due to wind speed continuing to increase (FIG. 6), braking torque is proportionally increased (FIG. 7) to a maximum breaking torque at about time "76" at a second setpoint rotational speed of the rotor, which is less than the fault speed.

Referring to FIG. 7, the maximum braking torque is held for a period of time while the rotor speed continues to increase slightly (FIG. 8) with a continuing increase in wind speed (FIG. 6). The rotor speed has not reached fault speed.

While the maximum braking torque is held (FIG. 7), rotor speed turns at about time "77" with a decrease in wind speed at the same time (FIG. 6). Maximum brake torque is held until rotor speed decreases below the second setpoint rotational speed at about time "78." As wind and rotor speed continue to decrease past time "78", the braking torque is decreased proportional to rotor speed until the rotor is essentially stopped at time "90."

In a further embodiment, the braking torque applied by the brake 52 may be augmented with aerodynamic braking torque applied to the rotor via the pitch controller 38 and associated pitch adjust mechanisms 37. FIG. 9 depicts pitch angle of the rotor blades 22 as a function of time in conjunction with the graphs of FIGS. 6 through 8. The dashed "baseline" line represents pitch angle that would be applied to reduce rotor speed without mechanical brake torque. The solid "smartbrake" line represents the reduced pitch angle when the braking force is augmented with the mechanical braking torque. Less pitch activity is needed as a result of rotor speed control being shared between the aerodynamic and mechanical braking. Likewise, less mechanical brake torque would be needed to achieve the same rotor speed profile of FIG. 8, which may result in decreased loads on the mechanical braking system (and correspondingly smaller design limits).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:
   a hub with a plurality or rotor blades configured thereon, said hub connected to a generator rotor via a drive train;
   a sensor disposed to monitor rotation of said rotor;
   a brake configured along the drive train between the hub and the generator to reduce the rotational speed of said rotor;
   a brake control system operatively coupled to said brake and said sensor, said brake control system configured to apply a braking torque to said rotor via said brake at a first setpoint rotational speed and to proportionally increase the braking torque as the detected rotational speed of said rotor increases beyond the first detected setpoint rotational speed; and
   wherein the first setpoint rotational speed is defined above a rated rotor speed for said wind turbine, said brake control system configured to initially apply the braking torque to said rotor at the first setpoint rotational speed and to increase the braking torque up to a full braking torque applied at a second setpoint rotational speed prior to said rotor reaching a fault rotational speed.

2. The wind turbine as in claim 1, wherein the first setpoint rotational speed is between rated speed and 103% of rated speed and said second setpoint rotational speed is less than 110% of rated speed.

3. The wind turbine as in claim 1, wherein said brake control system is configured to apply the increasing braking torque as a linear function of increasing rotor rotational speed.

4. The wind turbine as in claim 1, wherein said brake control system is configured to apply the increasing braking torque as an exponential function of increasing rotor rotational speed.

5. The wind turbine as in claim 1, wherein said brake is a hydraulic brake.

6. A method for controlling rotational speed of a wind turbine in an over speed condition, comprising:
   monitoring rotation of a wind turbine generator;
   applying a braking torque to the rotor at a first setpoint rotational speed with a brake configured along the drive train between the hub and the generator;
   proportionally increasing the braking torque with the brake as a function of rotor rotational speed as the rotational speed of the rotor increases beyond the first setpoint rotational speed; and
   wherein the first setpoint rotational speed is defined above a rated rotor seed for the wind turbine, and further comprising increasing the braking torque from an initial value at the first setpoint rotational speed up to a full braking torque applied at a second setpoint rotational speed prior to the rotor reaching a fault rotational speed.

7. The method as in claim 6, wherein the first setpoint rotational speed is between rated speed and 103% of rated speed and the second setpoint rotational speed is less than 110% of rated speed.

8. The method as in claim 6, wherein the braking torque is increased as a linear function of increasing rotor rotational speed between the first and second setpoint rotational speeds.

9. The method as in claim 6, wherein the braking torque is increased as an exponential function of increasing rotor rotational speed between the first and second setpoint rotational speeds.

10. The method as in claim 6, wherein the braking torque is applied with a hydraulic brake.

11. The method as in claim 6, comprising applying an aerodynamic braking torque to the rotor in conjunction a mechanical braking torque.

12. The method as in claim 11, wherein the first setpoint rotational speed is defined above a rated rotor speed for the wind turbine, and further comprising increasing the braking torque to the rotor from an initial value at the first setpoint rotational speed up to a full braking torque applied at a second setpoint rotational speed prior to the rotor reaching a fault rotational speed.

13. The method as in claim 12, comprising increasing the aerodynamic braking torque as a function of increasing rotor rotational speed between the first and second rotational setpoint rotational speeds.

14. The method as in claim 13, wherein the aerodynamic braking torque is increased linearly or exponentially between the first and second rotational setpoint rotational speeds.

* * * * *